(12) United States Patent
Pretterebner et al.

(10) Patent No.: US 8,414,863 B2
(45) Date of Patent: Apr. 9, 2013

(54) HYDROGEN AND ENERGY GENERATION BY THERMAL CONVERSION OF SILANES

(75) Inventors: Julius Pretterebner, Oppenweiler (DE); Norbert Auner, Glashuetten (DE)

(73) Assignee: SPAWNT Private S.A.R.L., Luxembourg (LU)

( * ) Notice: Subject to any disclaimer, the term of this patent is extended or adjusted under 35 U.S.C. 154(b) by 0 days.

(21) Appl. No.: 12/358,470

(22) Filed: Jan. 23, 2009

(65) Prior Publication Data

US 2009/0208407 A1 Aug. 20, 2009

Related U.S. Application Data

(63) Continuation of application No. PCT/EP2007/006592, filed on Jul. 25, 2007.

(30) Foreign Application Priority Data

Jul. 25, 2006 (DE) .................. 10 2006 034 885

(51) Int. Cl.
C01B 3/02 (2006.01)
C01B 3/24 (2006.01)
(52) U.S. Cl.
USPC ....................... 423/648.1; 423/650
(58) Field of Classification Search ............ 423/658.2, 423/648.1
See application file for complete search history.

(56) References Cited

U.S. PATENT DOCUMENTS

| | | | | |
|---|---|---|---|---|
| 3,117,838 A | * | 1/1964 | Sterling et al. | 423/335 |
| 3,447,237 A | * | 6/1969 | Tokuyama et al. | 438/783 |
| 4,002,512 A | * | 1/1977 | Lim | 438/546 |
| 4,155,712 A | | 5/1979 | Taschek | |
| 4,377,564 A | | 3/1983 | Dahlberg | |
| 5,372,617 A | * | 12/1994 | Kerrebrock et al. | 48/61 |

FOREIGN PATENT DOCUMENTS

| | | | |
|---|---|---|---|
| DE | 30 00 802 | | 1/1980 |
| DE | 300802 A | * | 1/1980 |
| DE | 3000802 | | 7/1981 |
| DE | 30 16 807 | | 11/1981 |
| DE | 697 24 358 | | 7/2004 |
| DE | 601 08 744 | | 3/2006 |
| EP | 0471139 | | 2/1992 |
| GB | 745698 | | 2/1956 |
| GB | 826575 | | 1/1960 |
| GB | 885117 | | 12/1961 |
| JP | 73-007 246 | | 9/1966 |
| JP | 73007246 | | 9/1966 |
| JP | 73007246 B | * | 9/1966 |
| JP | 59045901 | | 9/1982 |
| JP | 59-045901 | | 3/1984 |

(Continued)

OTHER PUBLICATIONS

Google's cache of http://www.c-f-c.com/gaslink/docs/silane.htm, Dec. 18, 1998, lines 13-14.*

(Continued)

*Primary Examiner* — Melvin C Mayes
*Assistant Examiner* — Kenneth Vaden
(74) *Attorney, Agent, or Firm* — Brinks Hofer Gilson & Lione

(57) ABSTRACT

The invention relates to a process for preparing hydrogen. According to the invention, monosilane or polysilane is converted to hydrogen at an elevated temperature with steam or oxygen.

13 Claims, 2 Drawing Sheets

FOREIGN PATENT DOCUMENTS

Figure 1:
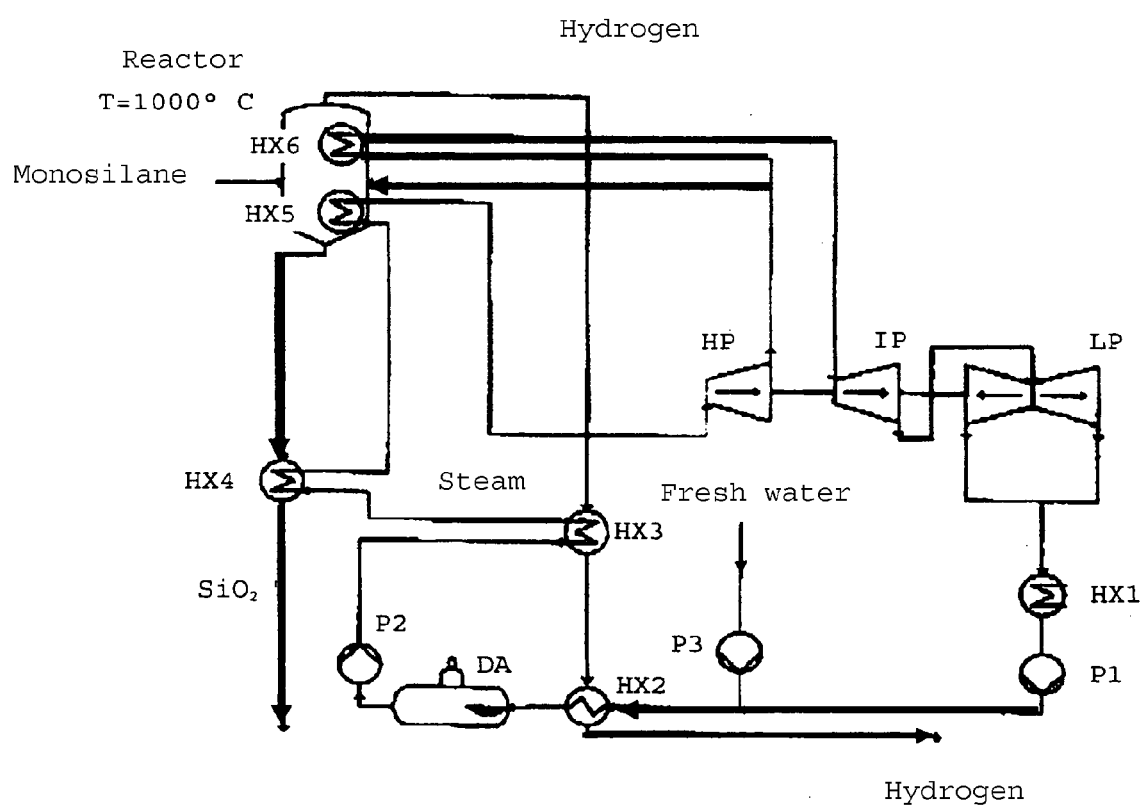

| | | |
|---|---|---|
| JP | 2001-511429 | 8/2001 |
| JP | 2004-514632 | 5/2004 |
| JP | 2005-504695 | 2/2005 |
| JP | 2006-273644 | 10/2006 |
| JP | 2009-545842 | 12/2009 |
| WO | 0185606 | 5/2001 |
| WO | 01/85606 | 11/2001 |
| WO | 02/090257 | 11/2002 |
| WO | 02090257 | 11/2002 |
| WO | 2007/019172 | 2/2007 |
| WO | 2007019172 | 2/2007 |

OTHER PUBLICATIONS

XP-002421818 *A Novel Sodium Silicate Fluoride Solution and a $H_2$ Gas Formed by a Reaction Between Si and an Aqueous Solution of NaOH and NaF*, Department of Environmental Chemistry, College of Environmental Engineering and Architecture, Kanazawa Institute of Technology, Ishikawa 921-8501, Japan, Jun. 2005.

International Search Report PCT/EP2007/006592, Jan. 14, 2008.

Isao Tsuyumoto. "A novel sodium silicate fluoride solution and H2 gas formed by a reaction between Si and an aqueous solution of NaOH and NaF." *Journal of American Ceramic Society*, Blackwell publishing, vol. 88, Jun. 2005, pp. 1628-1630.

P. J. Tobin, J. B. Price, and L. M. Campbell "Gas Phase Composition in the Low Pressure Chemical Vapor Deposition of Silicon Dioxide." *Journal of Electromechanical Society*, vol. 127, Issue 10, pp. 2222-2227 (1980).

B. Fegley, Jr. and Ronald G. Prinn "Chemical Constraints on the Water and Total Oxygen Abundances in the Deep Atmosphere of Jupiter." *The Astrophysical Journal*, vol. 324, pp. 621-625 (1988).

Fegley, Bruce et al., "Chemical Constraints on the Water and Total Oxygen Abundances in the Deep Atmosphere of Jupiter", The Astrophysical Journal, vol. 324, pp. 621-625 (1988).

Holleman-Wiberg, Arnold F. et al., Lehrbuch der Anorganischen Chemie (Textbook of Inorganic Chemistry), 102 Edition, pp. 938-941 (2007).

Stock, Alfred et al., "Siliciumwasserstoffe V[1]): Über Die Zersetzung Der Siliciumwasserstoffe Durch Wasser", Berichte Der Deutschen Chemischen Gesellschaft (Journal of The German Chemical Society), 51, pp. 989-996 (1918).

Tobin, P.J. et al., "Gas Phase Composition in the Low Pressure Chemical Vapor Deposition of Silicon Dioxide", Journal of Electrochemical Society: Solid-state Science and Technology, vol. 127, No. 10, pp. 2222-2227 (1980).

Tsuyumoto, Isao, "A novel sodium silicate fluoride solution and H2 gas formed by a reaction between Si and an aqueous solution of NaOH and NaF", Journal of the American Ceramic Society, Blackwell publishing, vol. 88, pp. 1628-1630 (Jun. 2005).

Ullmann's Encyclopedia of Industrial Chemistry, Chapter "Silicon Compounds, Inorganic".

T. Kato et al., Damageless H20/SiH4 plasma-CVD for gate SiOi, Digest of Technical Papers. Symposium on VLSI Technology, 1993, pp. 153-154.

\* cited by examiner

| Process | Version 1 | Version 2 | Version 3a | Version 3b | Version 3c | Version 4 |
|---|---|---|---|---|---|---|
| Reactor temperature [°C] | 400 | 400 | 1000 | 1000 | 1000 | 1000 |
| Reactor pressure [bar] | 3 | 80 | 80 | 80 | 80 | 300 |
| H2 temperature [°C] | 80 | 80 | 80 | 80 | 80 | 80 |
| H2 pressure [bar] | 3 | 3 | 3 | 30 | 80 | 3 |
| Fuel cell | X | X | X | X | X | X |
| Gas turbine | - | X | X | X | - | X |
| Water steam combination | - | X | X | X | X | X |
| $m_{SiH4}$ [t/h] | 92.9 | 92.9 | 92.9 | 92.9 | 92.9 | 92.9 |
| $m_{H2}$ [t/h] | 23.3 | 23.3 | 23.3 | 23.3 | 23.3 | 23.3 |
| $W_{el,netto}$ [MW] | 388.8 | 479.8 | 546.7 | 526.9 | 513.7 | 548.1 |
| Thereof fuel cell [MW] | 388.8 | 388.8 | 388.8 | 388.8 | 388.8 | 388.8 |
| $\varepsilon_{tot}$ | 35.00% | 42.98% | 48.98% | 47.20% | 46.02% | 49.04% |
| $\varepsilon_{tot,H2}$ | 67.92% | 75.73% | 81.73% | 79.95% | 78.77% | 81.75% |
| $\eta_{tot}$ | 34.04% | 42.00% | 47.86% | 46.13% | 44.97% | 47.99 |
| $\eta_{tot,H2}$ | 68.08% | 76.04% | 81.90% | 80.17% | 79.01% | 82.02% |

Fig. 2

HYDROGEN AND ENERGY GENERATION BY THERMAL CONVERSION OF SILANES

CROSS-REFERENCE TO RELATED APPLICATIONS

This application is a continuation of International Application No. PCT/EP2007/006592, filed on Jul. 25, 2007, which claims the benefit of DE 10 2006 034 885.0, filed Jul. 25, 2006. The disclosures of the above applications are incorporated herein by reference.

FIELD

The invention relates to a method for generation of hydrogen.

BACKGROUND

One of the two commercial methods for generation of pure silicon is the "Degussa method," which is based on monosilane as educt. The gaseous monosilane, with or without mixing with additional inert gases, is precipitated as silicon at temperatures above 1000° C. The reason for the high temperatures is chiefly to obtain a massive, polycrystalline silicon which can be easily processed to obtain higher purity, e.g., by melting. The thermal decomposition of monosilane into products containing more or less amounts of hydrogen, however, begins at significantly lower temperatures.

References in the literature show that at pressures between 0.13 and 6.61 MPa and temperatures of about 400-600° C., agglomerated spherical particles are produced with an average diameter of 3 µm. Other sources specify the beginning of the decomposition at 450° C. and reported a 75% decomposition at 500° C. and then complete conversion at 700° C. However, lower reaction temperatures resulted in fine-particulate or even amorphous reaction products, which were also observed as byproducts of the Degussa method. Methods which produce fine-particulate silicon condensing from the gas phase as their primary product require an additional processing of the powder, in order ultimately to allow processing into massive silicon.

Relatively little is known about reactions of monosilane with water. From the literature it is known that neutral, liquid water is essentially inert with respect to monosilane, since water can be used to wash out trace gases from monosilane. Likewise, monosilane contaminated with hydrogen also occurs in technical processes.

On the other hand, it is known that Si—H-bonds are not stable in basic solutions, since Si has a high oxophilia. Even the alkali content of glass is sufficient to initiate the decomposition. Likewise, decomposition occurs in acid solution, albeit at a slower rate than in the alkaline pH-range.

From semiconductor engineering it is known that liquid water reacts with silicon surfaces and leaves oxide layers on the order of 1 nm. Likewise, $SiO_2$-layers can be produced under low pressure in CVD processes from various substituted silanes or from Si—H-compounds mixed with hydrogen.

Experiments with mixtures of salts which contain free x-ray amorphous silicon, produced from $SiCl_4$+4 Na->$Si_{am}$+4 NaCl in nonpolar organic solvents show that inert gas saturated with hydrogen does not have an oxidative effect at room temperature, but that at 400° C. more than 70% reaction is achieved after about 3 hr, and at 550° C. more than 75% has reacted.

The alkaline conversion of silanes for generation of hydrogen is known from JP 59045901 A. This method has the disadvantage that lye is used, that excess water is produced and thus a high mass transport is present.

SUMMARY

The present disclosure creates an effective method for the production of hydrogen. This method is attained, for example, by the features of patent claim 1.

The thermal conversion of silanes with steam or oxygen has the advantage of high hydrogen efficiency. In addition, the process is emission-free. The hydrogen produced is highly pure and is thus suitable primarily for use in PEM [Proton Exchange Membrane] fuel cells.

In one form, a process for production of hydrogen is provided, characterized in that silane is converted with steam or oxygen at elevated temperature to obtain hydrogen.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a process flow chart according to one of the more complex variants of the method, whereby simplifications and variations of the process are possible but are not illustrated separately; and FIG. 2 is an overview of simulation results on different variants of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

According to equation 1, monosilane ($SiH_4$) reacts with water at temperatures above 400° C. to yield hydrogen and $SiO_2$: (1) $SiH_4 + 2H_2O \Rightarrow SiO_2 + 4H_2$.

This reaction can be the basis for a power plant process. In its simplest form, the reaction according to equation 1 is carried out at a temperature of 400° C. and a pressure of 3 bar in a reactor. The heat released is used to evaporate the water supplied to the reactor. The excess heat is released to the environment. The produced hydrogen is sent to a PEM fuel cell (FC) (version 1).

Provided the reaction will also run at higher pressures (e.g., 80 bar), electrical energy can also be obtained, if the hydrogen is expanded in a gas turbine before entering the fuel cell. In this case, the solids must be separated in a cyclone. A portion of the heat released from the reactor can also be used for evaporation of additional water, so that this water can be sent to a steam turbine (version 2).

Since the parameters of the fresh steam itself are very low (max. 400° C. at 80 bar) one must determine whether the reaction is self-sustaining even at 1000° C. The high temperatures are even an advantage for the gas turbines whose efficiency increases with the inlet temperature, and also for the steam cycle, in which the fresh steam parameters corresponding to the prior art can be attained. The production of hydrogen was calculated at three different pressures. These were: 3 bar (version 3a), 30 bar (version 3b) and 80 bar (version 3c). Since the reactor pressure corresponds to 80 bar, in version 3c the gas turbine is omitted. Finally, an additional pressure increase in the reactor is possible (300 bar), in order to enhance the power of the gas turbine (version 4).

The process flow chart of version 3 is the most complex and is illustrated in FIG. 1. The other versions are simplifications or variations of version 3, so that they are not illustrated.

The energy efficiencies presented in table 1 are related to the heating value of monosilane, which is computed as 44.26 MJ/kg (compare methane: 50 MJ/kg). Provided the hydrogen is not supplied to the fuel cell, the efficiencies additionally take into account the heating value of hydrogen (120 MJ/kg) instead of the generated electric energy.

However, the exergetic efficiency takes into account the chemical and the physical exergies of monosilane and/or hydrogen.

Efficiency without fuel cell:

$$\eta_{tot,H_2} = \frac{\dot{m}_{H_2} * LHV_{H_2} + \dot{W}_{el,nestro}}{\dot{m}_{SiH_a} * LHV_{SiH_a}} \quad (2)$$

$$\varepsilon_{tot,H_2} = \frac{\dot{E}_{H_2} + \dot{W}_{el,nesto}}{\dot{E}_{SiH_a} + \dot{E}_{H_2O}} \quad (3)$$

Efficiency with fuel cell:

$$\eta_{tot} = \frac{\dot{W}_{el,nesto}}{\dot{m}_{SiH_2} * LHV_{SiH_2}} \quad (4)$$

$$\varepsilon_{tot} = \frac{\dot{W}_{el,nesto}}{\dot{E}_{SiH_2} + \dot{E}_{H_2O}} \quad (5)$$

In the completed simulation of processes, heretofore no pressure losses have been taken into account. In addition, a complete reaction and an ideal separation of mixtures were also assumed. The isentropic efficiencies of the technical components were selected as 90% for gas turbines and medium pressure turbines, 89% for the high-pressure turbines, 87% for the low-pressure turbines and 85% for the pumps. The fresh steam parameters were 600° C. and 300 bar, and/or 600° C. for the intermediate superheater. The heat from the solids was used down to a minimum temperature of 100° C. for heating of the steam cycle. The heat released from the fuel cell is not used so far.

As Table 1 shows, the best efficiency is expected for version 4. However, the improvements over version 3a are comparatively small. An overview of the results is presented in the table in FIG. 2.

Proceeding from the standard formation enthalpies of monosilane and of water and SiO2 (approximated as quartz), it turns out that the conversion of monosilane with water to SiO2 should run exothermally, with SIH4+2 H2O->SiO2+4 H2 ΔΔ<sub>f</sub>H0=−373.4 kJ/mol.

Actually, the released quantity of heat will be smaller, since $SiO_2$ is not present as crystalline quartz, and the reaction product can also be present as the hydrate (containing Si—OH) depending on the reaction temperature and time, so that the stochiometry of the reaction will be changed.

In comparison to elemental silicon, poly- and oligosilanes, and in particular monosilane, are better suited as hydrogen reservoirs, since relative to the educt mass, more hydrogen can be liberated (Si+2 $H_2O$->$SiO_2$+2 $H_2$). By neglecting the water used and also any added catalysts or reactants, for elemental Si we obtain a hydrogen storage density of about 14%, for $(SiH_2)x$ however, 20%, and for $SiH_4$, 25%. Including the stochiometrically converted water, storage capacities of about 6% (Si), 9% $((SiH_2)_x)$ and 11.5% are obtained. Theoretically, a purely thermal release of the contained hydrogen from the silanes is possible according to the Degussa method, such that elementary silicon is produced as a byproduct from $SiH_n$->Si+n/2 $H_2$ (n=2 to 4). The storage capacity for this decomposition route would be for $((SiH_2)x$ at about 6.5%, for $SiH_4$ at 12.5%. Unfortunately, the silicon obtained cannot be reversibly converted back into the silanes by simple hydration reactions. With reference to the known alkaline generation of hydrogen from elementary silicon according to the equation Si+2 NaOH+$H_2O$->$Na_2SiO_3$+2 $H_2$ there already is one Japanese patent disclosure JP 59045901 A which shows the conversion of silanes with alkaline solutions according to the following sample reaction:

$SiH_2$+2 NaOH+$H_2O$->$Na_2SiO_3$+3 $H_2$

Under consideration of the above information, it can be assumed that an alkaline catalysis or the reaction with alkali at elevated temperatures is unnecessary.

If monosilane or a gaseous or finely dispersed oligosilane is brought into contact with steam under the reaction conditions at temperatures of 400° C. or more and at pressures of at least 0.1 MPa, then even if the direct reaction does not occur, a conversion will take place since elementary Si is released by gas phase thermolysis and this silicon reacts with water. Since the cell size in the gas phase should be clearly smaller than the 3 μm observed in the end stage, this means that the atomic silicon or silicon present in clusters would have to be essentially completely converted. It can not be ruled out, however, that the reaction product, in particular at comparatively low reaction temperature, will still contain Si—H-bonds, which has a negative effect on the hydrogen yield.

On the other hand, the exothermy of the reaction should result in additional self-heating of the reaction mixture. The most effective mixing ratio of $SiH_4$: $H_2O$ is difficult to estimate, but due to the stochiometry of the reaction, a minimum quantity of 1:2 is needed for complete oxidation. Likewise, it is not impossible that the conversion will begin at temperatures even <400° C.

Except for residual water vapor, the hydrogen generated in this manner is pure after removal of the generated particles, and is thus particularly suitable for use in PEM fuel cells. Due to its high storage capacity, this process could also even be used in mobile systems. Instead of an electrochemical conversion of course, combustion of the hydrogen and/or of the hydrogen/steam mixture is possible in any kind of internal combustion engine. For the application of this technology, however, care must be taken that the particulate load of the hydrogen gas generated is as small as possible, in order to minimize abrasion on moving parts. Alternatively, a separation of combustion chamber and working gas volume is also possible, as in a Stirling engine, for example.

Also, the direct combustion of silanes with air is possible for generation of thermal energy. According to the equation:

$SiH_4$+2 $O_2$->$SiO_2$+2 $H_2O$ ΔΔ<sub>f</sub>H0=−1516.6 kJ/mol a quantity of thermal energy can be estimated from the standard formation enthalpies, but in practice it can turn out to be smaller due to the reasons presented above. Furthermore, it must be taken into account that steam and not liquid water is the reaction product of the combustion. Calorimetric combustion experiments have shown that cyclopentasilane $(SiH_2)_5$ in an oxygen atmosphere releases a combustion heat of 35.2 kJ/g. For comparison, decane $C_{10}H_{12}$ has a combustion heat of 47.6 kJ/g in the same test equipment, and test runs with tetramethylsilane $Si(CH_3)_4$ yielded 45.2 kJ/g. Some additional comparison values are provided by the following table:

| Reaction mixture | Specific pulse [N sec/kg] | Adiabatic heat of combustion |
| --- | --- | --- |
| Cyclopentasilane + $O_2$ | 2886 | 2863 |
| $H_2 + O_2$ | 3632 | 3684 |
| Kerosene + $O_2$ | 2890 | 3736 |
| 1,1-dimethylhydrazine + $N_2O_4$ | 2777 | 3420 |

Under the assumption of a suitable separation—if necessary—of combustion chamber and abrasion-sensitive components, far more heat can be generated from $SiH_4$ with this procedure than by the exclusive, two-step use of hydrogen according to:

$4 H_2 + 2 O_2 \rightarrow 4 H_2O \ \Delta\Delta_f H0 = -1143.2$ kJ/mol.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

| List of Reference Symbols | |
| --- | --- |
| HP, IP; LP | Gas turbines |
| HX1-HX6 | Heat exchangers |
| P1-P3 | Pumps |

What is claimed is:

1. A process for production of hydrogen, the process comprising:
   providing a source of monosilane;
   providing a source of steam;
   providing a reactor in which the monosilane and steam interact, such that the silane is thermally reacted with the steam at a pressure of at least 3 bar and a temperature above about 400° C. to obtain hydrogen without using an alkaline catalyst; and
   removing particles from the generated hydrogen.

2. The process of claim 1, wherein the process also results in the formation of silicon dioxide.

3. The process of claim 2, wherein the silicon dioxide comprises a silicon dioxide hydrate.

4. The process of claim 1, wherein the process further comprises one or more heat exchangers, the heat exchangers capable of transferring at least a portion of the heat to water used to form the steam.

5. The process of claim 1, wherein the process further comprises the step of using the hydrogen in a proton exchange membrane (PEM) fuel cell or to drive a gas turbine.

6. The process of claim 1, wherein the particles are removed using a cyclone.

7. The process of claim 1, wherein the silane and steam are reacted at a pressure of at least 80 bar.

8. The process of claim 7, wherein the silane and steam are reacted at a pressure of at least 300 bar.

9. The process of claim 5, wherein the PEM fuel cell has an efficiency of 67.9-81.75%.

10. The process of claim 9, wherein the PEM fuel cell has an efficiency of 75.7-81.75%.

11. The process of claim 1, wherein the temperature is between about 400° C. to 1000° C.

12. The process of claim 11, wherein the temperature is between about 400° C. to 600° C.

13. A process for production of hydrogen, the process comprising interacting an oliqosilane or polysilane and steam, such that the oliqosilane or polysilane is thermally reacted with the steam at a temperature above about 400° C. to obtain hydrogen without using an alkaline catalyst.

* * * * *